(No Model.)
S. F. SHELBOURNE.
MEANS FOR CONTROLLING AND LIMITING INDUCTION.
No. 297,178. Patented Apr. 22, 1884.
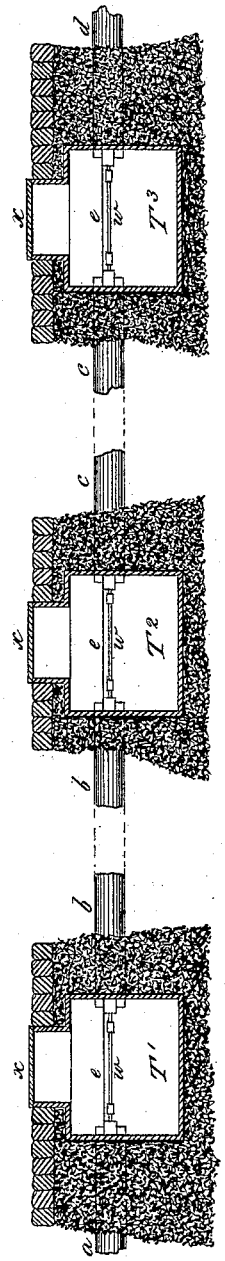
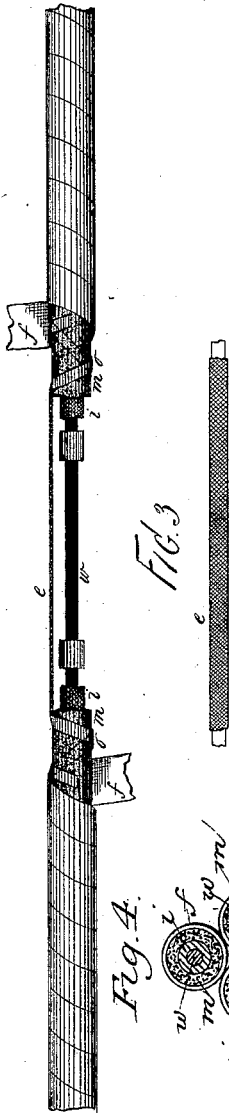
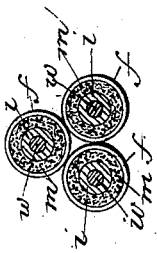
Witnesses:
John Buckler
Geo. L. Weed
Inventor:
Sidney F. Shelbourne

UNITED STATES PATENT OFFICE.

SIDNEY F. SHELBOURNE, OF NEW YORK, N. Y.

MEANS FOR CONTROLLING AND LIMITING INDUCTION.

SPECIFICATION forming part of Letters Patent No. 297,178, dated April 22, 1884.

Application filed August 18, 1883. (No model.)

*To all whom it may concern:*

Be it known that I, SIDNEY F. SHELBOURNE, a citizen of the United States, residing in the city of New York and State of New York, have invented a new and useful Means for Controlling and Limiting Induction between Wires Conveying Electric Currents, of which the following is a specification.

It is well known that when parallel wires near to each other in groups or cables convey intermittent or variable electric currents the inductive action of each upon the others causes induced or derived currents, which tend to confuse and, in long telephonic lines, even to overwhelm the voice effect to be derived from the useful and intended currents. Various means have been contrived to prevent this inductive effect; but quite all of them have proved defective in some particular by reason of error either of theory or in the practical application of the means employed. One of the methods adopted experimentally—at first with some promise—to prevent induction, has been to lead a conducting-connection in contact with the metal coatings covering the several insulations of the individual wires (such metal coatings being in contact with each other in the group or cable) to the ground at frequent intervals along the lines of telephonic communication, the object being to lead off to the earth the induced currents, and thus prevent their action upon the adjacent conducting-wires. This method had for its object and effect to give the useful line-wire, by means of its own metallic coating and those of its group or cable, an easy and multiplied inductive connection with the earth. Thus, while the evil effects of dynamic induction were possibly partly avoided, there resulted in consequence a greater static capacity and retardation in the useful wire by reason of the fact that the multiplied surfaces of the several coatings in contact with each other gave the earth's neutral electricity a full, free, and close approach to the outer surface of the dielectric between the wire and its metallic covering, and thus readily supplied the conditions necessary to static charges in the useful wire in the same manner as the free conductive connection of the outer coating of a Leyden jar with the earth enables the inner coating to receive a charge many times greater than its capacity when the outer coating is insulated from the earth. It is also seen that there are as many partial and local influences of induction as there are connections of the conductor-coating with the earth along its length, so that the unity of effect desired in the useful current will be disturbed from multiplied sources of variable influence. The practical consequence of the method explained was that for short distances the telephonic sounds were distinct in articulation and free from confusion by dynamic currents; but for distances varying about the limit of two miles the sounds approached the quality of distant and prolonged echoes. The present invention has for its object the application of a reverse method—namely, the insulation of the coatings from the earth to the utmost possible extent consistent with the problem of providing for the effects of dynamic influences, and also to arrive at better results even in that direction. In an underground line the method explained would seek to have all the coatings of the wires in the cable in conductive contact with each other, and the outside ones as much as possible in contact with their iron or other metal tube inclosing them, and so in free intercourse with the earth's neutral electricity. My invention requires that each coating should be insulated from the earth and from every other coating laterally, and that the coating of each wire in one cable, where it terminates at the test-boxes, should be connected conductively, as well as its inclosed wire, across the test-boxes with a like coating in the next cable, so that for dynamic induction a unity of effect and protection from lateral conduction shall be secured, and for static charge its conditions of existence be rendered so remote and the surfaces of the exterior access of the earth's influence so small that it may practically cease to be of trouble in telephone-lines of ordinary length.

The figures of the drawings making part of this specification illustrate the application of the principles involved to an underground cable.

Figure 1 represents vertical sections of three several test or connection boxes beneath the pavements at T', T², and T³, with their covers x x x, and at a, b b, c c, and d perspective associated divisions of the line of cables in their several sections of inclosing-conduit. In this figure w w w represent the connections of continuity of one of the line-wires, and e e e the connections between the metal coatings surrounding the insulation of the several divisions of that line-wire.

In Fig. 2 one of the line-wires, with its coatings and connections, is shown in perspective on an enlarged scale. The line-wire w may be connected in continuity in any manner usually employed, and that connection itself may be covered with an insulating material to prevent metallic contact with other connections. The insulating-coverings of the wire w are shown at i i, and the next covering of metal or paramagnetic substance at m m. At e is shown the metallic connection between the conductive coatings m m. This connection may be made in any ordinary manner, the figure showing merely one of the methods proposed. The material used is a strip of copper one-eighth of an inch wide by one sixty-fourth of an inch thick, and covered with a braiding saturated with insulating material. This strip is shown more clearly in Fig. 3. In Fig. 2 a piece of it stripped on its ends of its insulating covering is seen embracing the metallic induction-coating surrounding the insulation of the wire w at o. The outside covering insulating the metallic induction-coatings of the wires from each other is seen partly rolled back at $ff$.

Fig. 4 shows a group of wires singly represented in Fig. 2, and composing a line or cable of conductors, each of them having its induction-shield insulated from those of the wires next adjacent.

What is claimed as new is—

1. A sectional cable, in combination with the test-boxes in which the cable-sections are united, and the conducting-strip e, or its equivalent, joining the induction-shields of said united sections, for the purpose of unifying the currents of induction between the sending and receiving points of communication, substantially as described.

2. In combination with the test-boxes of an underground sectional cable and the conductive connection of the individual induction-shields of the several conductors composing such sections of the cable with each other in pairs across such test-boxes, the outer insulation of the induction-shield of each of the several conductors, by which it is inclosed and separated from conductive contact with each and all of the others laterally, as and for the purpose herein set forth.

SIDNEY F. SHELBOURNE.

Witnesses:
 FRANK S. TYLER,
 GEO. L. WEED.